Sept. 6, 1949.    S. E. MANESS, JR., ET AL    2,481,135
VEHICLE COOLING SYSTEM

Filed Feb. 19, 1948                    2 Sheets-Sheet 1

Sterling E. Maness, Jr.
Sterling E. Maness, Sr.
INVENTORS.

BY
Attorneys

Sterling E. Maness, Jr.
Sterling E. Maness, Sr.
INVENTORS.

Patented Sept. 6, 1949

2,481,135

UNITED STATES PATENT OFFICE 2,481,135

VEHICLE COOLING SYSTEM

Sterling E. Maness, Jr., Wheaton, and Sterling E. Maness, Sr., Rocky Comfort, Mo.

Application February 19, 1948, Serial No. 9,556

12 Claims. (Cl. 123—174)

This invention relates to an emergency cooling system and is especially adapted for connection with a motor vehicle.

An object of the invention is to provide a device that will cool an overburdened motor in an automobile or the like.

A further object of the invention is to provide a device that is easily connected to a motor vehicle.

A still further object of the invention is to provide a device where it is possible to quickly provide a storage space for the cooling fluid when it is to be used on the vehicle.

Another object of the invention is to provide a device that will utilize the fan of the motor to assist in the cooling action.

And still another object of the invention is to provide a remote control means to operate either the cooling system, or the regular fuel supply system.

With the above and other objects in view which will more fully appear, the nature of the invention will more clearly be understood by the description and claims, as well as the figures illustrated in the accompanying drawings.

Like reference numerals designate corresponding parts throughout the several views of the drawings.

Figure 1:
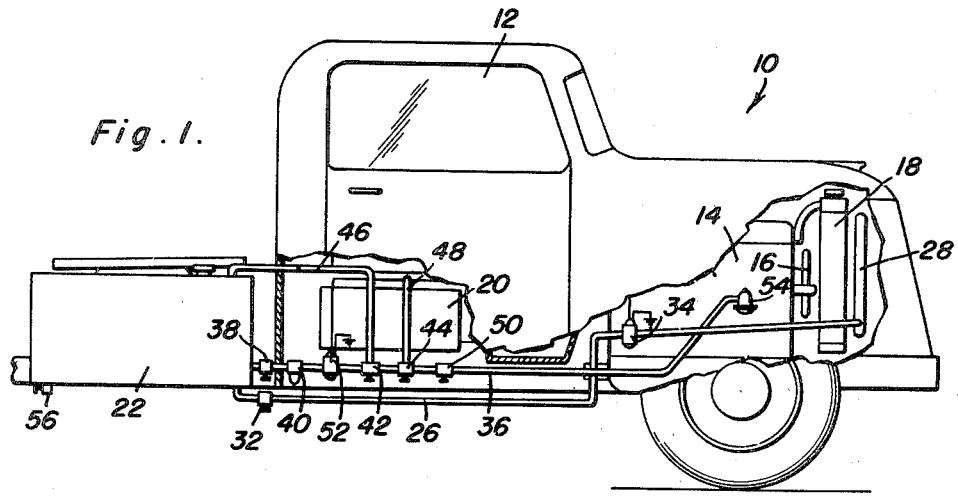
Figure 1 is a side elevation of the front portion of a motor vehicle, with parts broken away to disclose the invention.

Referring to Figures 1 through 3 and 6, a motor truck or similar vehicle is indicated generally at 10 and shows a cab section 12, an engine 14, a fan 16, and a radiator 18. A main fuel tank 20 is mounted in the vehicle in any well-known manner, and a pair of auxiliary fuel tanks 22 and 24 are suitably mounted on the sides of a truck, or in any manner convenient.

A conduit line 26 is secured to one of said auxiliary fuel tanks, such as is shown at 22, and terminates at the forward end of the vehicle, preferably in close association with the radiator 18 in an annular spray ring 28 provided with suitable perforations 30 on the side facing the radiator. A valve 32, is inserted in conduit line 26 at a point adjacent the fuel tank 22 and a suitable pump 34 is placed in the line for a purpose presently to be described. It is to be noted that conduit 26 is connected to tank 22 at its bottom wall, while a similar conduit line 36 is positioned at a slightly higher level. A cut-off valve 38, similar to valve 32 is placed in the line adjacent the outlet end of tank 22, a filter 40 of substantial size in order to avoid frequent emptying thereof is added to line 36 near cut-off valve 38. Thus, any sediment or other foreign particles, together with any water entrained in tank 22, will settle out in filter 40, prior to entry into the carburetor of the engine. Suitable valves 42 and 44 are supplied in line 36 to control the flow of gasoline, from tank 22 to auxiliary tank 24 and main fuel tank 20. Auxiliary tanks 24 and main tank 20 are connected respectively to fuel line 36 by means of conduits 46 and 48 respectively. A second cut-off valve 50 is placed in the line after valve 44, for use when the fuel supply to the engine 14 is to be closed. An actuating pump 52 is positioned in line 36 between filter 40 and valve 42 to control the flow of fuel in line 36. Line 36 terminates in the carburetor of engine 14 as is generally indicated at 54. A drain-cock 56, of usual construction, is located in auxiliary tank 22 and a fuel supply inlet 58 is provided in each of tanks 22 and 24.

Figure 2:
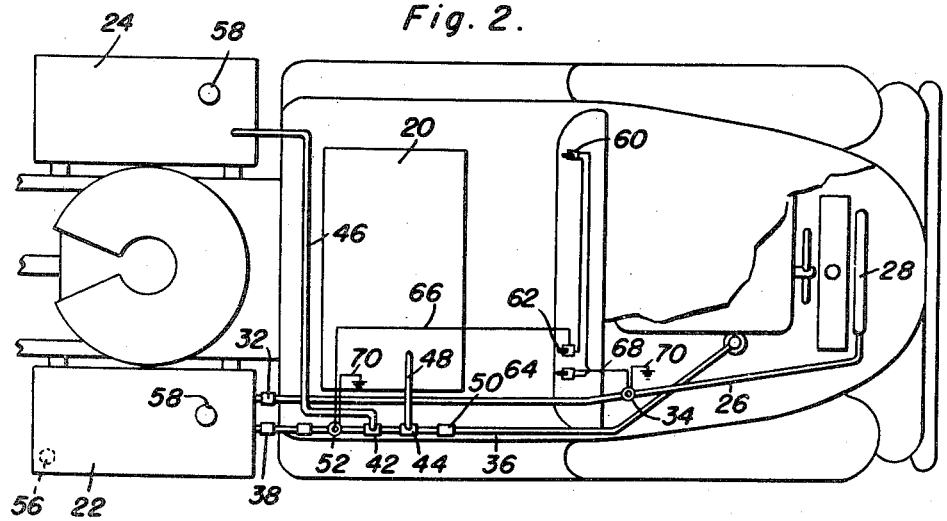
Figure 2 is a top plan view of the invention mounted on the vehicle.
Figure 6:
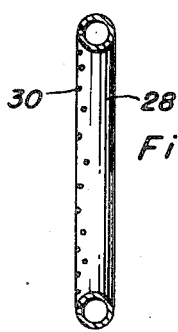
Figure 6 is a vertical sectional view of the spray means taken along line 6—6 of Figure 3.

Referring to Figure 2, a main switch 60 is located on the dashboard of the vehicle and controls secondary switches 62 and 64. Line 66, leading from switch 62, is connected to pump 52 on fuel line 36, while line 68 leads from switch 64 to pump 34 in the coolant supply line 26. Both circuits are suitably grounded, as shown at 70.

From the above description, the operation of the device is readily apparent. When it is desired to supply auxiliary cooling water, or the like, to an overtaxed motor on a vehicle, auxiliary tank 22 will be employed to store such fluid. Any gasoline that is in tank 22, will be removed therefrom and sent first to auxiliary tank 24 and then to main tank 20 by closing master switch 60, and secondary switch 62, thus operating pump 52 in line 36. Valve 50 will have been closed, and valve 42 will be open. While valve 44 may be simultaneously opened, it is generally preferred to close valve 44 too, and permit pump 52 to remove the gasoline from tank 22 and store it in auxiliary tank 24 via conduit 46. When tank 24 has been filled, valve 42 is closed and valve 44 is opened to collect the remainder of the fuel left over in tank 22 to be stored in main tank 20. When tank 22 is completely empty, switch 62 is opened and valve 38 is closed. Switch 64 is then closed and pump 34 is energized. Meanwhile, tank 22 will have been filled with water and valve 32 will be opened. Upon operation of pump 34, water is pumped through line 26 and transferred to annular ring 28 to be sprayed upon radiator 18. Obviously, switch 62 will have again been closed in order to supply fuel to carburetor 54. When it is no longer necessary to provide emergency cooling, switch 64 is opened, valve 32 is closed, and drain-cock 56 is opened to drain all of the remaining water.

In order to insure that any water that may remain on the bottom of tank 22, is not carried over into the fuel supply line, line 36 has been positioned slightly above the bottom of the tank, and may be so constructed that it does not reach to the bottom of the tank, as is usual. Of course, this need not be usually so constructed, since virtually all of the cooling fluid will have drained through drain-cock 56, and any small amount of water that may travel into the fuel line will settle out in filter 40.

Figure 4:
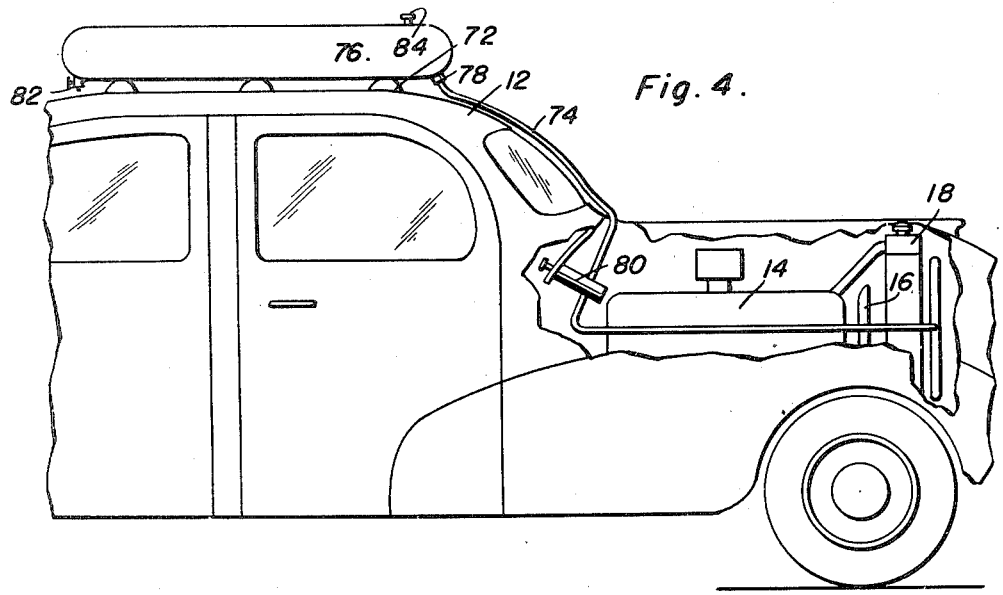
Figure 4 is a simple modification of the device of the invention, employing gravity feed to operate the device.
Figure 5:
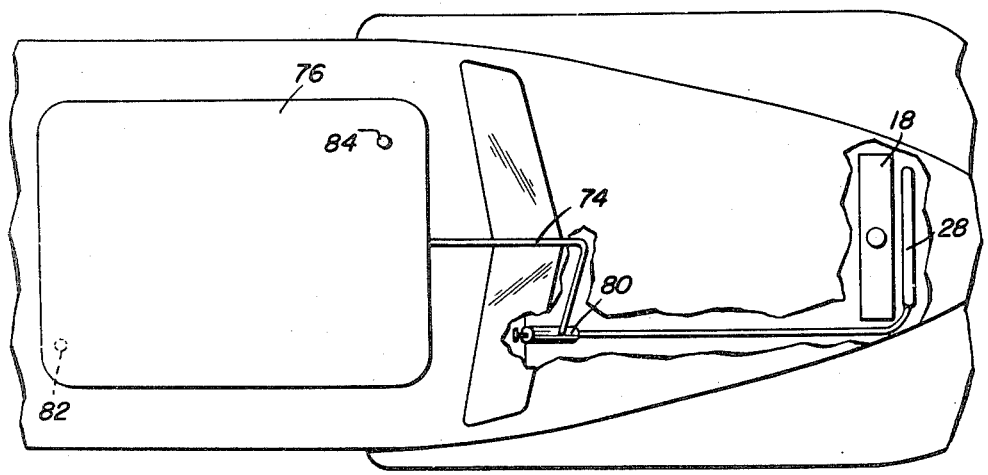
Figure 5 is a top plan view of the invention shown in Figure 4.
Figure 3:
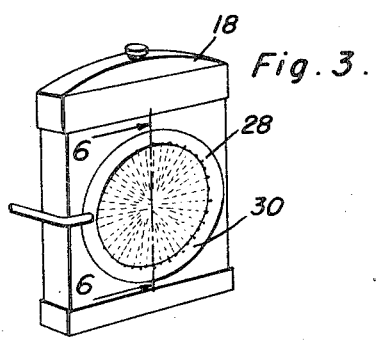
Figure 3 is a perspective view of the radiator of the vehicle, with the spray means in operative position.

Referring to Figures 4 and 5, there is seen illustrated a simple modification of the device of the invention. In this construction, the feed of cooling fluid is obtained by simple gravity flow, and the necessity for electrical connections is obviated. Thus, a suitable tank, made of rubber or metal, or the like, is positioned on the cab of a truck or automobile and retained thereon by means of suction cups 72. A conduit line 74 connected to tank 76 by couplings or the like 78 leads through the cowl on the vehicle to terminate in the perforated annular spray ring 28 described in connection with the embodiment shown in Figures 1 and 2. A suitable valve 80 is inserted into line 74 and controls the flow of fluid through the system. A suitable drain-cock 82 is supplied at the lower end of tank 76 and a suitable inlet means 84 is provided in the tank.

When it is desired to operate the device, it is merely a matter of filling tank 76 and opening valve 80 to supply a spray fluid to radiator 18 and engine 14.

The fan 16 on engine 14 assists in the cooling operation by dispensing the cooling spray over the radiator, as well as drawing the fluid through by suction effect.

Thus, it is readily seen that an efficient and yet simply constructed device has been perfected to cool a super-heated vehicle. This invention is particularly useful where the truck driver is apt to travel through desert sections of the country. Prior to this, heavy laden trucks and over-burdened automobiles, travelling through arid areas or through mountainous terrain frequently overheat their engines and radiators and as a result, it becomes necessary to stop and secure water. In addition to being time consuming, it may not always be possible to secure the necessary water and as a result, the driver is forced to depend upon passing traffic for assistance. In the instance where perishables or the like are being transported by truck, such delay may prove to be costly in both the loss of products and market.

It is to be noted that the device is readily adaptable for use with heavily armored vehicles such as tanks and half-tracks, where the excessive weight and heavy armor plating tends to overheat the engine.

While in the foregoing there has been shown and described preferred embodiments of the invention, it is to be understood that minor changes in the details of construction, combination and arrangement of parts may be resorted to without department from the spirit and scope of the invention as claimed.

Having described the invention what is claimed as new is:

1. In an emergency cooling system for a motor vehicle having an engine and a main cooling system therefor, a main fuel tank, an auxiliary fuel tank, a carburetor on said engine and conduit means connecting said main and auxiliary tanks to said carburetor, said emergency system comprising; spray means associated with a part of said main cooling system for discharge of a cooling medium thereon, a conduit connecting said auxiliary tank and spray means, and operating means in said conduit and said conduit means to effect flow thereby.

2. The combination of claim 1, wherein said spray means consists of a perforated annular ring.

3. The combination of claim 1, wherein said conduit includes a pressure operated means to control the flow of fluid medium and a cut-off valve.

4. The combination of claim 1, wherein said conduit includes a pump to control the flow of fluid medium, electrical means to actuate said pump and mounted in said vehicle, and a cut-off valve.

5. The combination of claim 1, wherein both said conduit means and said conduit include pressure operated means to control the flow of medium, and cut-off valves in each conduit.

6. The combination of claim 1, wherein said conduit means includes a conduit connected to said carburetor, a bypass pipe to said main tank and terminating in said carburetor conduit, a second pipe connecting said auxiliary fuel tank and said carburetor conduit and pressure operated means to control the flow of fuel.

7. In an emergency cooling system for a motor vehicle having an engine and a main cooling system therefor, an auxiliary fuel tank, said emergency system comprising; spray means associated with a part of said main cooling system for discharge of a cooling medium thereon, conduit means connecting said auxiliary tank and said spray means to effect fluid flow, and means in said conduit to shut off said flow.

8. The combination of claim 7, wherein said last named means is a cut-off valve, and pressure operated means in said conduit to control the flow of medium.

9. The combination of claim 7 wherein said spray means consists of a perforated annular ring.

10. The method of converting a part of the fuel supply of an auxiliary cooling system for cooling an engine on a vehicle comprising the steps of providing a main fuel supply, providing an auxiliary fuel supply, transferring the fuel in the auxiliary to the main supply, filling the auxiliary supply with another fluid, and spraying the second fluid on a part of the cooling system of the engine.

11. The method of claim 10 wherein the spray is in the form of an annular ring.

12. The method of claim 10, wherein the fuel is supplied to the engine.

STERLING E. MANESS, Jr.
STERLING E. MANESS, Sr.

REFERENCES CITED

The following references are of record in the file of this patent:

UNITED STATES PATENTS

| Number | Name | Date |
|---|---|---|
| 1,003,290 | Okrassa | Sept. 12, 1911 |
| 2,343,388 | Sebo | Mar. 7, 1944 |